United States Patent
Lucatello et al.

(10) Patent No.: US 10,487,704 B2
(45) Date of Patent: Nov. 26, 2019

(54) SYSTEM FOR VARIABLE ACTUATION OF A VALVE OF AN INTERNAL-COMBUSTION ENGINE

(71) Applicant: C.R.F. Societa Consortile per Azioni, Orbassano (Turin) (IT)

(72) Inventors: Marco Lucatello, Orbassano (IT); Francesco Vattaneo, Orbassano (IT); Vittorio Doria, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 51 days.

(21) Appl. No.: 15/364,554

(22) Filed: Nov. 30, 2016

(65) Prior Publication Data

US 2017/0183990 A1 Jun. 29, 2017

(30) Foreign Application Priority Data

Dec. 24, 2015 (EP) .................... 15202663

(51) Int. Cl.
| | |
|---|---|
| F01L 9/02 | (2006.01) |
| F01L 1/26 | (2006.01) |
| F01L 1/46 | (2006.01) |
| F02B 69/06 | (2006.01) |
| F01L 1/08 | (2006.01) |
| F01L 1/38 | (2006.01) |
| F02D 13/02 | (2006.01) |

(52) U.S. Cl.
CPC ............. *F01L 9/023* (2013.01); *F01L 1/08* (2013.01); *F01L 1/267* (2013.01); *F01L 1/38* (2013.01); *F01L 1/462* (2013.01); *F01L 9/021* (2013.01); *F02B 69/06* (2013.01); *F02D 13/02* (2013.01); *F02D 13/028* (2013.01); *F01L 2800/00* (2013.01); *F01L 2820/01* (2013.01); *Y02T 10/18* (2013.01)

(58) Field of Classification Search
CPC ... F01L 1/245; F01L 9/021; F01L 9/02; F01L 9/023; F01L 1/08; F01L 1/267; F01L 1/38; F01L 1/462; F02B 69/06; F02B 75/02; F02D 13/02; F02D 13/028
USPC .................... 123/21, 90.15; 60/602; 701/112
See application file for complete search history.

(56) References Cited

U.S. PATENT DOCUMENTS

| | | | |
|---|---|---|---|
| 871,602 A | 11/1907 | Loeffler | |
| 4,664,070 A * | 5/1987 | Meistrick | F01L 9/021 123/21 |
| 5,537,976 A * | 7/1996 | Hu | F01L 9/021 123/322 |

(Continued)

FOREIGN PATENT DOCUMENTS

| | | |
|---|---|---|
| EP | 1726790 A1 | 11/2006 |
| EP | 2796675 A1 | 10/2014 |

(Continued)

OTHER PUBLICATIONS

European Search Report dated Jul. 19, 2016 for EP Application 15202663.9, 5 pages.

*Primary Examiner* — Syed O Hasan
(74) *Attorney, Agent, or Firm* — RMCK Law Group PLC (57) ABSTRACT

Described herein is a system for variable actuation of an engine valve of an internal-combustion engine, where the system is able to actuate the engine valves, selectively, in a four-stroke operating mode and in a two-stroke operating mode, on the basis of the operating conditions of the engine.

10 Claims, 9 Drawing Sheets

(56) References Cited

U.S. PATENT DOCUMENTS

| | | |
|---|---|---|
| 6,257,176 B1 | 7/2001 | Shimasaki et al. |
| 7,559,300 B2 * | 7/2009 | Ruggiero ................ F01L 9/021 123/90.12 |
| 7,997,237 B2 * | 8/2011 | Surnilla .............. F02D 13/0211 123/21 |
| 2004/0221820 A1 * | 11/2004 | Opris ........................ F02B 1/12 123/21 |
| 2005/0205019 A1 * | 9/2005 | Burk ........................ F01L 1/08 123/21 |

FOREIGN PATENT DOCUMENTS

| | | | |
|---|---|---|---|
| FR | 2988771 A | 10/2013 | |
| JP | S58152139 A | 9/1983 | |

* cited by examiner

SYSTEM FOR VARIABLE ACTUATION OF A VALVE OF AN INTERNAL-COMBUSTION ENGINE

CROSS REFERENCE TO RELATED APPLICATIONS

This application claims priority to European Patent Application No. 15202663.9 filed on Dec. 24, 2015, the entire disclosure of which is incorporated herein by reference.

FIELD OF THE INVENTION

The present invention relates to systems for variable actuation of engine valves for internal-combustion engines, of the type comprising:
- a hydraulic apparatus including:
- a master piston;
- a slave piston that can be driven by said master piston by means of a volume of fluid set between said master piston and said slave piston; and
- a solenoid valve configured for assuming a state in which said volume of fluid is set in communication with an outlet so as to render said slave piston independent from the movement of said master piston;
- a camshaft designed to drive said master piston in motion; and
- a control unit configured for controlling said solenoid valve so as to govern said engine valve, in said four-stroke engine operating mode, according to a lift and/or opening and closing times that are variable as a function of one or more parameters indicative of the operating conditions of the engine.

PRIOR ART

The present applicant has for some time been developing internal-combustion engines provided with a system for variable actuation of the engine intake valves, which has the characteristics referred to above and is marketed under the trademark "Multiair". The present applicant is the holder of numerous patents and patent applications regarding engines provided with a system of the type specified above and components of this system.

Figure 1:
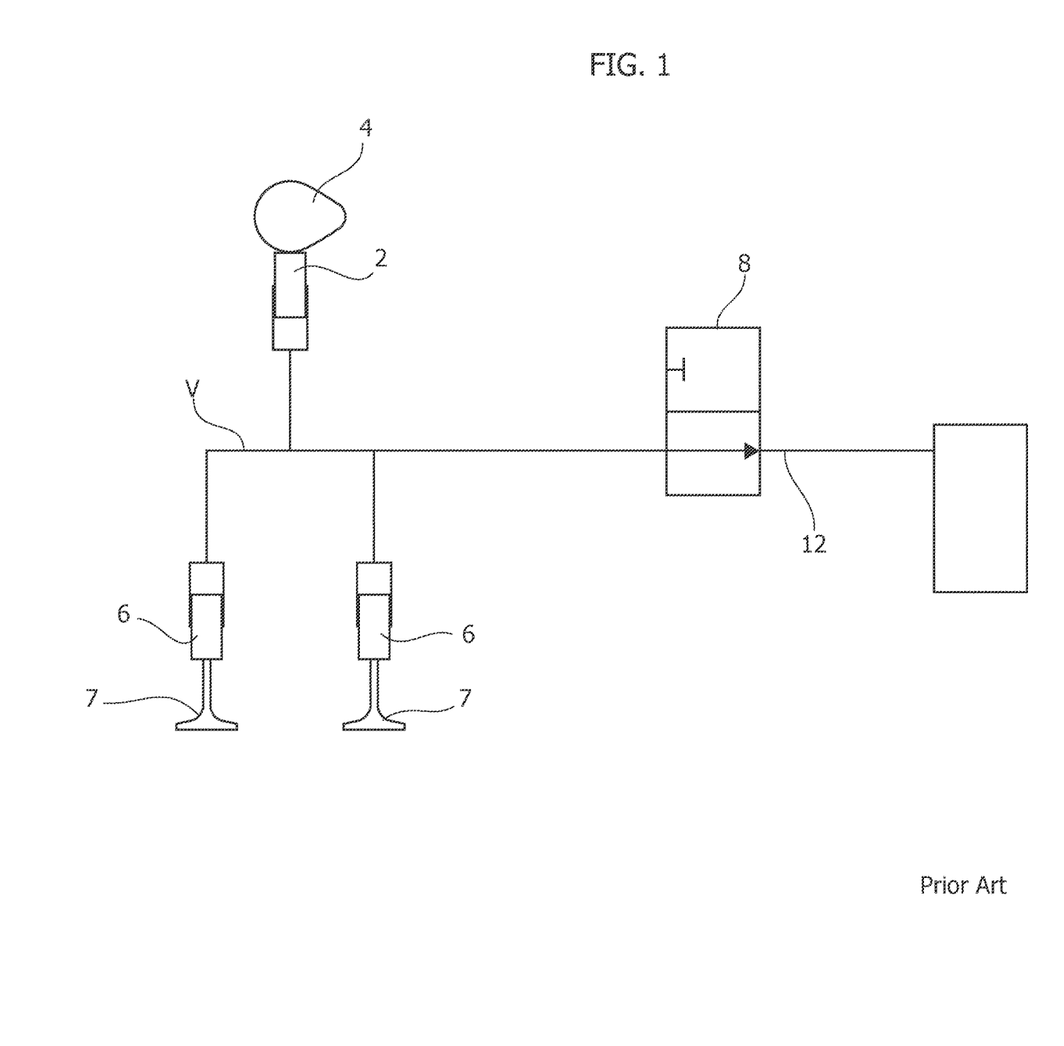
FIG. 1 is a diagram of a system for variable actuation of the valves of an internal-combustion engine, according to the known art.

FIG. 1 of the annexed drawings shows an example of the system in question, which is used for actuation of two intake valves 7 of a cylinder of an internal-combustion engine. In the example illustrated, the system comprises a master piston 2 that is moved by a cam 4 and drives the respective slave pistons 6 of the two intake valves 7, for bringing the latter into the opening condition, by means of the volume of fluid V that sets itself between the slave pistons 6 and the master piston 2.

The solenoid valve 8 controls communication of the chambers of the hydraulic circuit within which the various pistons move with an outlet 12 connected to a fluid accumulator. When the solenoid valve is brought into the closed state B, the master piston 2 and the slave pistons 6 are rigidly connected in the transmission of the motion of opening and closing of the valves 7. When, instead, the solenoid valve is open, the chambers of the various pistons are in communication with the low pressure at the outlet 12, and the slave pistons 6 are hence rendered independent from the movement of the master piston 6. The solenoid valve 8 is normally in the open state, and goes into the closed state following upon electrical actuation of the valve itself.

In the system described, when the solenoid valve 8 is activated, i.e., it is brought into the closed state, the engine valve follows the movement of the cam (full lift). An anticipated closing of the engine valve can be obtained by opening the solenoid valve 8 so as to empty out the volume of pressurized fluid V and obtain closing of the valve 7 under the action of the respective return springs (not shown). Likewise, a delayed opening of the valve 7 can be obtained by delaying closing of the solenoid valve 8, whereas the combination of a delayed opening and an anticipated closing of the valve can be obtained by closing and opening the solenoid valve during thrust of the corresponding cam. According to an alternative strategy, in line with the teachings of the patent application Ser. No. EP1726790A1 filed in the name of the present applicant, each intake valve can be controlled in multilift mode, i.e., according to two or more repeated "subcycles" of opening and closing. In each subcycle, the intake valve opens and then closes completely.

In the light of what has been said above, the electronic control unit is consequently able to obtain a variation of the instant of opening and/or of the instant of closing and/or of the lift of the intake valve as a function of one or more operating parameters of the engine, such as the position of the accelerator pedal, the engine r.p.m., or the engine temperature (for example, the temperature of the oil or the temperature of the coolant). This enables an optimal engine efficiency to be obtained in every operating condition.

OBJECT AND SUMMARY OF THE INVENTION

The general object that the present applicant now pursues is to improve further the efficiency of the engine, in particular by providing a system for variable actuation of the valves that will enable one or more of the following advantages to be achieved:
- the possibility of running the engine in a wide range of values of compression ratio, in particular on high values of this ratio;
- an improvement of the consumption levels;
- the possibility of providing engines of small dimensions given the same power delivered;
- the reduction of the work of pumping performed by the pistons; and
- the possibility of providing lower compression ratios within the range of action of the turbosupercharger.

The object indicated above is achieved via a system for variable actuation of an engine valve of an internal-combustion engine, comprising the characteristics of claim 1.

The system described herein is characterized in that it is able to actuate the engine valves, selectively, in a four-stroke operating mode and in a two-stroke operating mode, on the basis of the operating conditions of the engine, in particular on the basis of the conditions of engine load.

The system described herein is able to provide the above dual operating mode by exploiting the capacity of the actuation systems described above to actuate the engine valves in a variable way. In general, the system described herein presents the following characteristics:
- the camshaft has a cam provided with a composite profile that is defined by a first portion for governing, through the master piston, the engine valve at least in a four-stroke engine operating mode, and that is moreover defined by a second portion pre-arranged for governing the engine valve at least in a two-stroke engine operating mode;
- the control unit is configured for selecting one between the two-stroke and four-stroke operating modes of the engine valve as a function of the conditions of engine load, and, on the basis of the mode selected, for controlling the solenoid valve so as to render the slave piston independent from the master piston along the aforesaid second cam profile or along the aforesaid first cam profile.

In addition to enabling control of the valves in the two two-stroke and four-stroke engine operating modes referred to above, the system described herein is moreover able to provide a variable actuation of the engine valves as a function of the operating conditions of the engine in order to guarantee optimal efficiency whatever the operating condition.

As will be seen in what follows, in a preferred embodiment, the actuation system envisages a phase variator designed to regulate the angular position of the camshaft relative to the crankshaft.

The present invention moreover regards a control method for a system for actuation of the engine valves of the type in question, as defined in claim 9.

BRIEF DESCRIPTION OF THE DRAWINGS AND OF SOME EMBODIMENTS OF THE INVENTION

Further characteristics and advantages of the invention will emerge from the ensuing description with reference to the annexed drawings, which are provided purely by way of non-limiting example and in which.

DETAILED DESCRIPTION OF THE INVENTION

In the ensuing description, various specific details are illustrated aimed at enabling an in-depth understanding of the embodiments. The embodiments may be provided without one or more of the specific details, or with other methods, components, or materials, etc. In other cases, structures, materials, or operations that are known are not shown or described in detail so that various aspects of the embodiment will not be obscured.

The references used herein are only provided for convenience and hence do not define the sphere of protection or the scope of the embodiments.

As is known, a typical four-stroke operating cycle of an internal-combustion engine comprises, in succession, an intake stroke, a compression stroke, an expansion stroke, and an exhaust stroke. The first two strokes, the intake and exhaust strokes, take place in a first crankshaft revolution, whereas the second two strokes, the expansion and exhaust strokes, take place in a subsequent crankshaft revolution. Usually, the intake stroke starts slightly before the end of the exhaust stroke of the previous cycle, when the piston has not yet reached top dead centre (TDC).

Also a two-stroke cycle envisages four strokes—intake, compression, expansion, and scavenging—, which, however, take place during one and the same crankshaft revolution. In this operating mode, exhaust of the burnt gases occurs in the so-called scavenging stroke and mainly occurs as a result of entry of the air-petrol mix into the combustion chamber, which thrusts the burnt gases out of the chamber.

Traditional two-stroke engines do not have the engine valves as a four-stroke engine but ports or slits made directly on the walls of the cylinder, which are opened and closed as a result of the reciprocating motion of the piston.

It should now be noted that in the framework of the technical field in question there have already been proposed four-stroke internal-combustion engines pre-arranged for operating also in the two-stroke mode. This is obtained by providing a set of further cams, specific for the two-stroke mode, and providing appropriate mechanical members designed to set in connection this set of cams with the intake and exhaust valves, and at the same time to disconnect from the latter the cams for the normal four-stroke mode.

In this connection, the document No. JPS58152139 describes a supercharged internal-combustion engine that is pre-arranged precisely with two different sets of cams for actuation of the engine valves, a first set for actuation of the valves in the two-stroke operating mode and a second set for actuation of the valves in the four-stroke operating mode. Selection of one or other of the two sets occurs via a system for positioning of the rockers associated to the valves, which is designed to displace the rockers between their condition of engagement with the cams of one set and their condition of engagement with the cams of the other set.

It should moreover be noted that the cams for a two-stroke cycle are configured in such a way that, in the scavenging stroke, the intake and exhaust valves are kept simultaneously in the open position so that the gases entering from the intake duct can thrust the burnt gases out of the combustion chamber. This action of scavenging of the chamber is on the other hand promoted by the supercharging pressure with which the air-petrol mix is supplied into the combustion chamber.

The advantages for an internal-combustion engine deriving from the possibility of operating also according to a two-stroke cycle principally regard the conditions of high load and lie in the fact that it is possible to exploit a number of combustion events of this cycle that is twice that of a four-stroke cycle in order to reduce the pressures involved that are set up within the combustion chamber. This offers to the designer of the engine the possibility of setting higher compression ratios without any risk of detonation, and, possibly, of reducing the overall dimensions of the engine given the same maximum torque delivered.

The system for variable actuation of the engine valves described herein is pre-arranged for providing the same possibility of passing from a four-stroke operating mode to a two-stroke operating mode, and vice versa, as the one envisaged by the solution of the document No. JPS58152139 discussed above.

As will be seen hereinafter, the above result is, however, obtained using the same type of hydraulic system that characterizes the systems for actuation of the engine valves described at the start and exploiting its capacity of variable actuation of the engine valves.

The actuation system thus obtained is hence characterized in that it presents the same properties of reliability and controllability of the above known systems. Moreover, the system described herein is able not only to actuate the engine valves in the most suitable operating mode, between the two-stroke mode and the four-stroke mode, but also to run the engine always according to the optimal operating parameters whatever the operating conditions.

Figure 3:
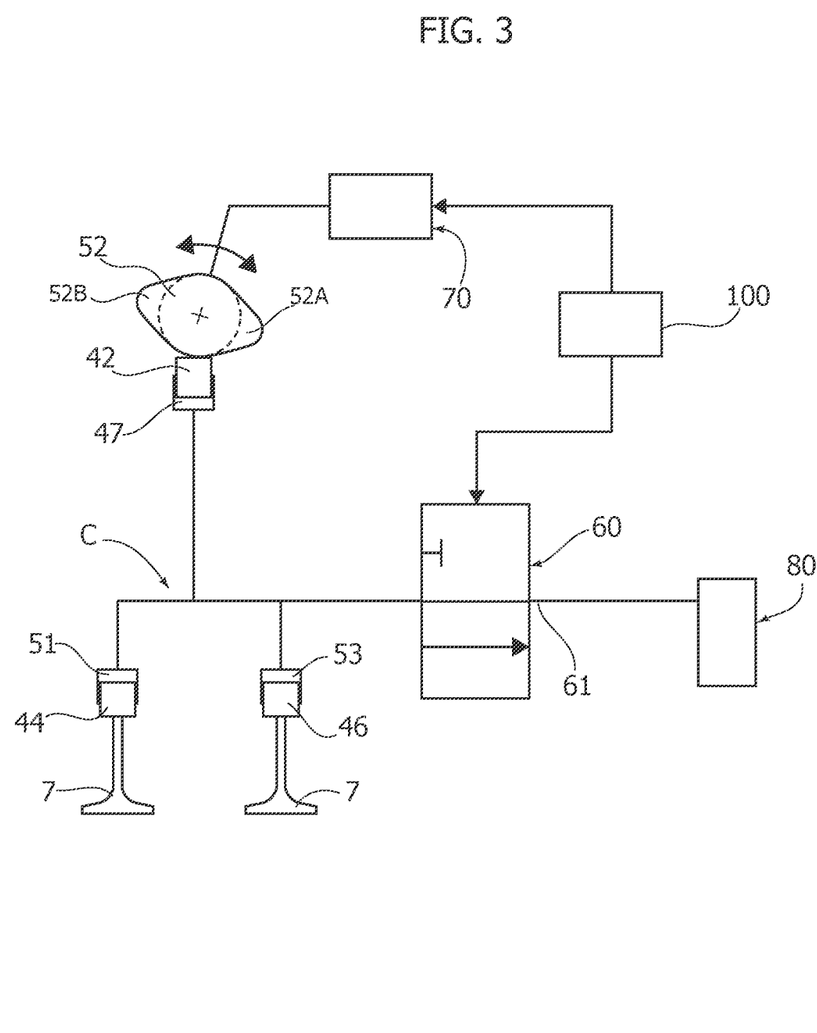
FIG. 3 is a diagram of a system for variable actuation of the valves of an internal-combustion engine, according to one embodiment of the invention.

FIG. 3 is a schematic illustration of an example of the actuation system described herein. In particular, the figure shows application of the system in question for actuation of two intake valves 7 of the cylinder of an internal-combustion engine.

The actuation system described herein comprises, in the first place, a hydraulic valve-actuation apparatus of a type similar to the one described above with reference to FIG. 1. With reference to FIG. 3, the above apparatus comprises a master piston 42, and two slave pistons 44 and 46, which are designed to drive the two intake valves 7. A hydraulic circuit C defines the respective chambers 47, 51, 53 mobile within which are the pistons 42, 44, 46, and connects hydraulically together the aforesaid chambers in such a way that the movement of the piston 42 induces a corresponding movement of the slave pistons 44 and 46 as a result of the action exerted thereon by the volume of fluid contained in the hydraulic circuit, which is displaced by the piston 42. Moreover, the apparatus in question comprises a solenoid valve 60, which is designed to control hydraulic connection between the chambers 47, 51, 53 and an outlet 61, which is in turn connected to a fluid accumulator 80. When the solenoid valve 60 sets the above chambers in communication with the accumulator 80, the fluid displaced by the piston 42 during its movement induced by the cam is discharged into the accumulator, and consequently the movement of the piston is not transmitted to the two slave pistons 44 and 46. In addition, if in this condition the two intake valves are in the their open position, the corresponding return springs bring them back into the closed position on account of the low pressure that is set up within the circuit, and the volume of fluid that is displaced by the two slave pistons 44 and 46 during this movement of return is also discharged into the fluid accumulator 80.

When, instead, the solenoid valve 60 closes the communication with the above accumulator, the volume of fluid comprised between the chamber 47 and the chambers 51 and 53 is prevented from coming out towards the accumulator 80 and can hence drive the pistons 44 and 46 as a result of the displacement of the piston 42. In this condition, the master piston 42 and the slave pistons 44 and 46 are, as a whole, rigidly connected in both of the movements of opening and closing of the valves. As will be seen in what follows, the movement of opening is governed by the camshaft, and the movement of closing is governed, instead, by the various return springs associated to the two valves and to the aforesaid pistons.

By appropriately controlling the opening and closing times of the solenoid valve 60, it is possible to render in the desired times and ways the engine valves independent from the mechanical profile of the respective cam and hence obtain a variation of the instant of opening and/or of the instant of closing and/or of the lift of the valve. There may hence, for example, be envisaged control strategies characterized by late opening, early closing, a combination of late opening and early closing, or again the so-called multi-lift strategy mentioned above. The various control strategies are saved in the control unit of the system.

The master piston 42 is driven by a cam 52.

In the system described herein, the cam 52 in question, designed to drive the master piston 42 of the hydraulic apparatus described, has a composite profile i.e., a profile configured for enabling actuation of the valves both in the two-stroke engine operating mode and in the four-stroke engine operating mode, and includes a first lobe portion 52A or 52B and a second lobe portion as the other of 52A and 52B, noting that these lobe portions are also referred to herein as lift curves associated with the subject lobe portions.

Figure 5:
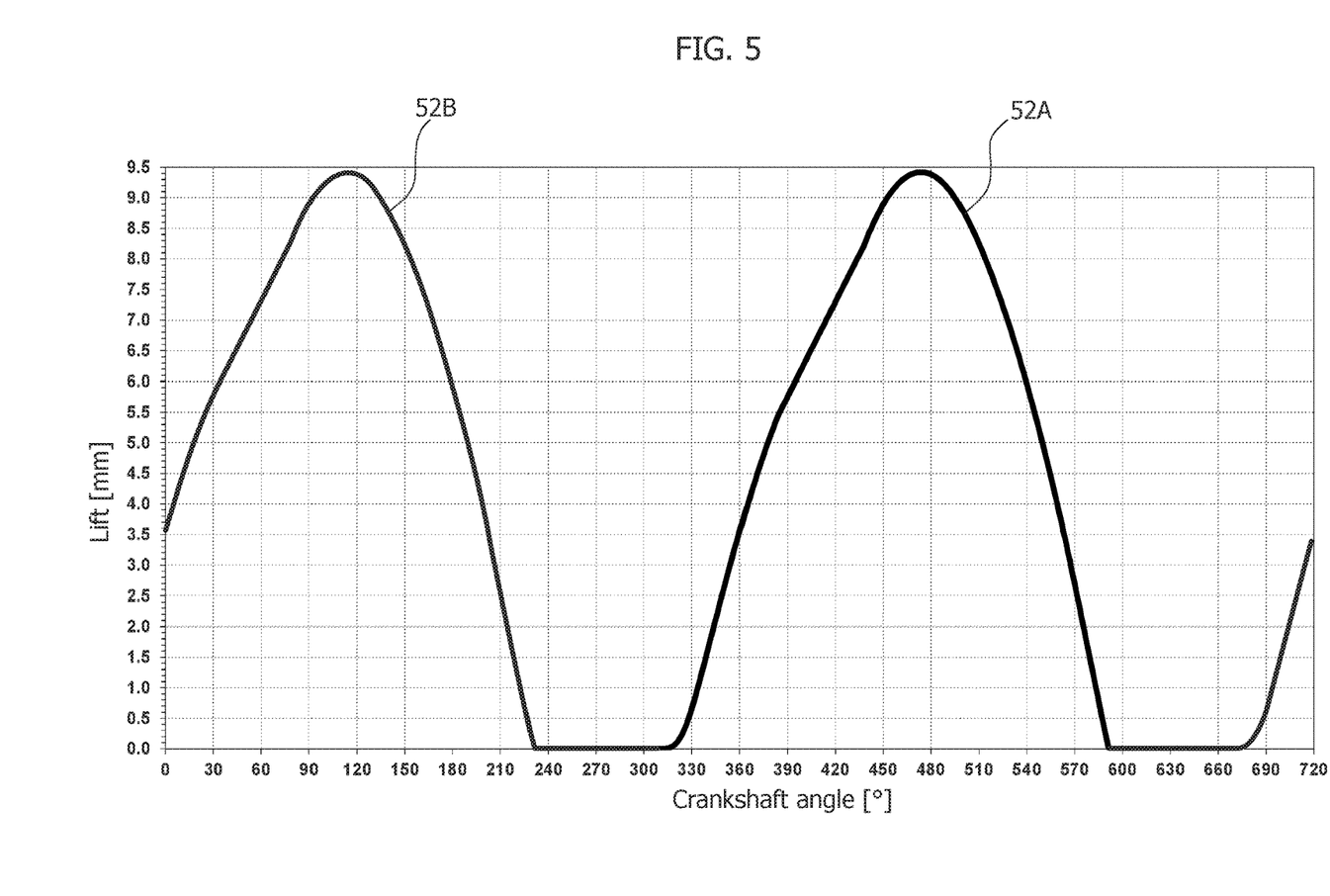
FIG. 5 illustrates an example of cam profile used in the system described herein for actuation of the intake valves.

FIG. 5 illustrates an example of the aforesaid profile. In the first place, the profile in question is characterized in that it presents two distinct lift curves along its extension (which are designated in the figure by the references 52A and 52B, respectively) so as to be able to govern opening of the valve for each crankshaft revolution, as envisaged in the two-stroke engine operating mode. Moreover, each of the two lift curves has an initial stretch of the ascending profile that is steeper so as to enable fast opening of the valve and thus favour the scavenging stroke of the cycle.

It should now be noted that in the four-stroke engine operating mode only one of the two lift curves of the profile is used, and the system envisages setting to zero the other curve via intervention of the hydraulic apparatus described above, i.e., setting the chamber 47 of the master piston 42 in communication with the accumulator 80 in such a way that the movement induced on the piston by this other curve is not "perceived" by the slave pistons 44 and 46.

The system described herein further comprises a phase-variator device 70 designed to regulate the angular position of the camshaft of the cam 52 relative to the crankshaft.

This is done to be able to vary the instant of opening of the valves on the basis of the engine operating mode selected, in particular operating in such a way that the intake valves can be actuated according to the times typical of each of the two modes.

Figure 2:
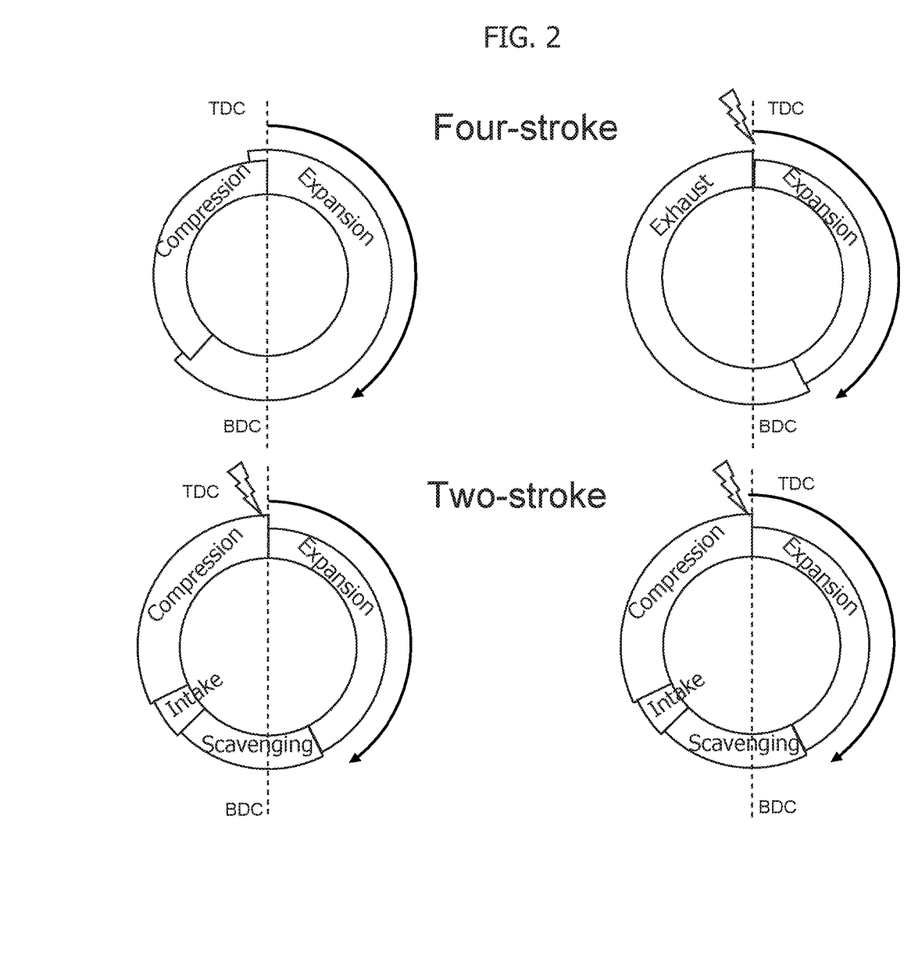
FIG. 2 is a schematic illustration of two examples, one regarding a four-stroke operating cycle and one regarding a two-stroke operating cycle of an internal-combustion engine.

In this connection, with reference again to FIG. 2, it may be noted that—according to the conventional control modes—in the four-stroke operating mode the intake stroke starts slightly in advance with respect to top dead centre (TDC) and terminates after bottom dead centre (BDC), whereas, in the two-stroke operating mode, the intake stroke in question (accompanied by the scavenging stroke) is performed approximately at BDC, starting slightly in advance with respect to BDC and terminating in a point approximately corresponding to that in which the intake stroke terminates in the four-stroke operating mode.

Figure 4A:
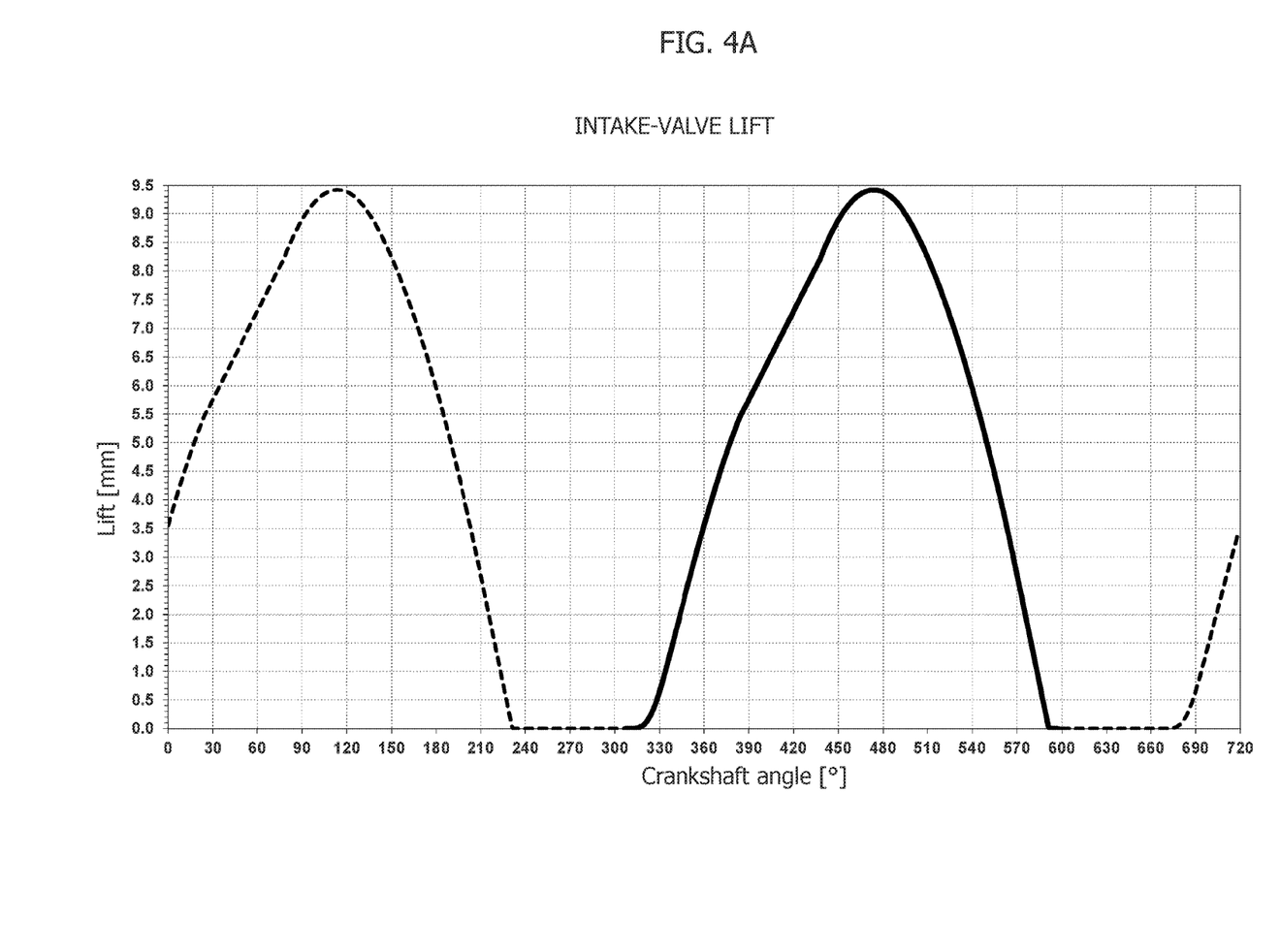
FIGS. 4A and 4B illustrate two different profiles of lift of the intake valves of an engine for a four-stroke engine mode and for a two-stroke engine mode, respectively.
Figure 4B:
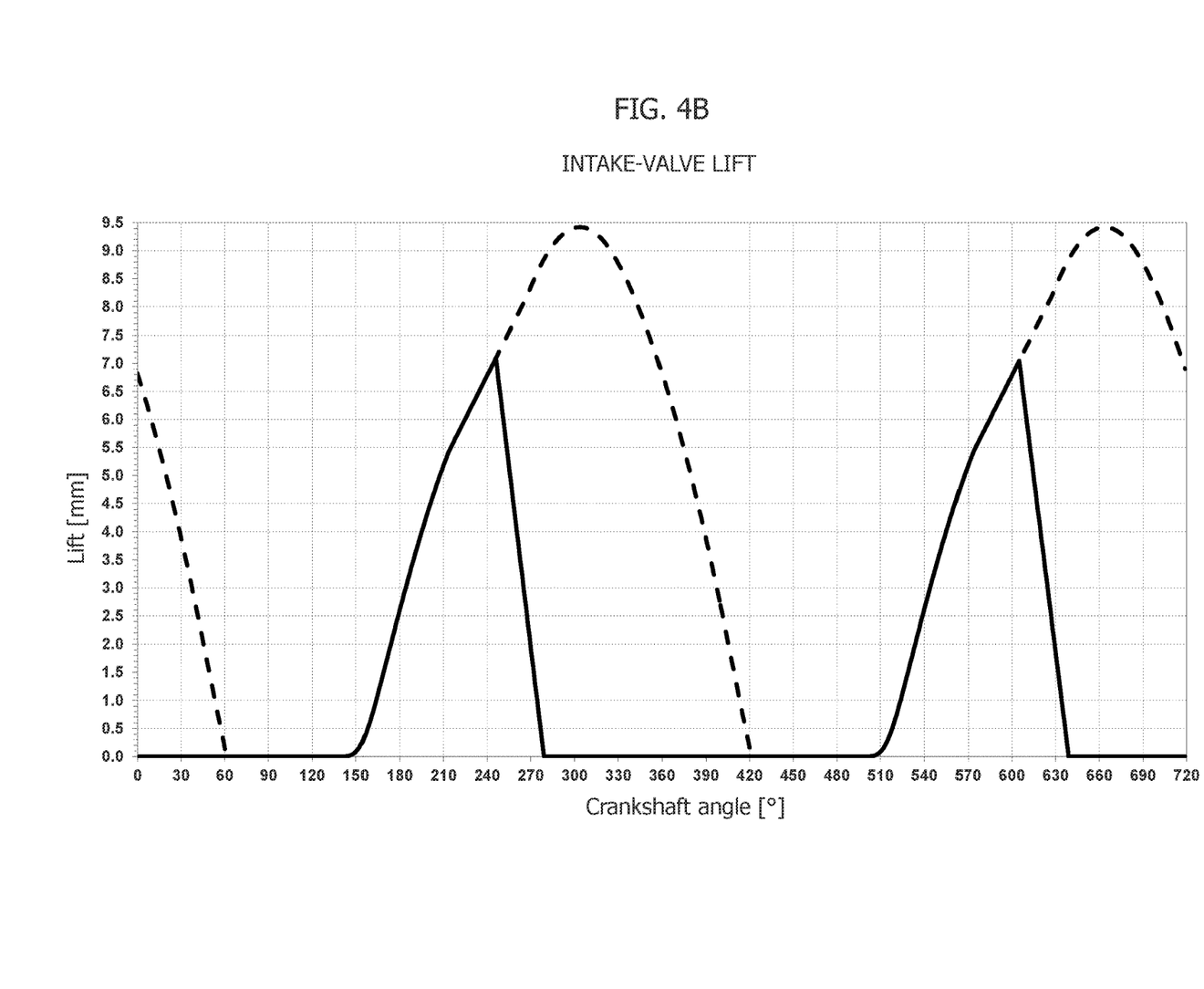

With reference now to FIGS. 4A and 4B, these illustrate by way of example two possible lift profiles followed by the intake valves—for a rotation of the crankshaft of 720° C.—in the two operating engine modes in question, which are obtained starting from the cam profile of FIG. 5. As emerges clearly from the above figures, the lift profile of the four-stroke operating mode is characterized in that it reproduces just one of the two lift curves of the cam 52 (in the example illustrated the curve 52A; it should be noted that the same system could be configured for using one or other of the two curves according to the circumstances). On the other hand, the lift profile of the two-stroke engine operating mode is characterized, instead, in that it is phase shifted by approximately 180° C. with respect to the profile of the four-stroke engine operating mode and in that it reproduces just part of the cam profile, thus identifying a lower lift peak as compared to the maximum one defined by the cam profile and a duration of opening of the valve that is also shorter than the one that would be determined by the aforesaid cam profile.

In the light of what has been said above, to govern the engine valves according to the two profiles illustrated, the system hence envisages, in the four-stroke operating mode, controlling the solenoid valve 60 so as to bring to zero one of the two lift curves of the cam profile, whereas, in the two-stroke operating mode, it envisages governing the phase-variator device so as to delay actuation of the valve, and, at the same time, it envisages controlling the solenoid valve 60 so that it will get it to carry out both of the lifts governed by the cam but, as has been seen, according to respective curves that have smaller dimensions than the corresponding profile defined by the cam.

To be able to provide the control described above, the system comprises a control unit (designated by the reference 100 in FIG. 3), which is, in the first place, configured for selecting the engine operating mode on the basis of its operating conditions, in particular on the basis of the engine load. In various preferred embodiments, the control unit is configured for selecting the two-stroke engine operating mode for conditions of load higher than a given value, and for selecting, instead, the four-stroke engine operating mode in the other conditions. The parameters used by the system for measuring the engine load may, for example, be the angular position of the accelerator pedal, the pressure inside the intake duct or the exhaust duct, the pressure inside the combustion chamber, etc. In any case, the control unit has, stored therein, a reference value corresponding to the aforesaid given value of engine load, and is configured for selecting the operating mode on the basis of the comparison between the measured parameter and the reference value.

The control unit then controls the solenoid valve 60 and the phase-variator device for governing the engine valves in the mode selected.

As mentioned above, the system described herein is in any case also pre-arranged for governing a variable actuation of the engine valves as a function of the operating conditions of the engine, such as speed, load, temperature of the engine, etc., in a way similar to what occurs in the variable-valve-actuation (VVA) systems of the type described at the start with reference to FIG. 1. In particular, by controlling the solenoid valve 60, it is possible to render in the desired times and ways the engine valves independent from the mechanical profile of the respective cam and hence obtain a variation of the instant of opening and/or of the instant of closing and/or of the lift of the valve. There may hence, for example, be envisaged control strategies characterized by late opening, early closing, a combination of late opening and early closing, or again the so-called multi-lift strategy mentioned above.

It should be noted, on the other hand, that, in the system described herein, the aforesaid variable control of the valves is based not only on the operating parameters of the engine referred to above, but also on the operating mode selected.

In the system described herein, it is hence possible to envisage various modes for control of the engine valves—for example, a conventional mode, a late-opening mode, an early-closing mode, a combined late-opening and early-closing mode, and a multi-lift mode—and to differentiate the control modes to be used between one engine operating mode and the other. By so doing, the operating efficiency of the engine is optimal for any condition.

Figure 6:
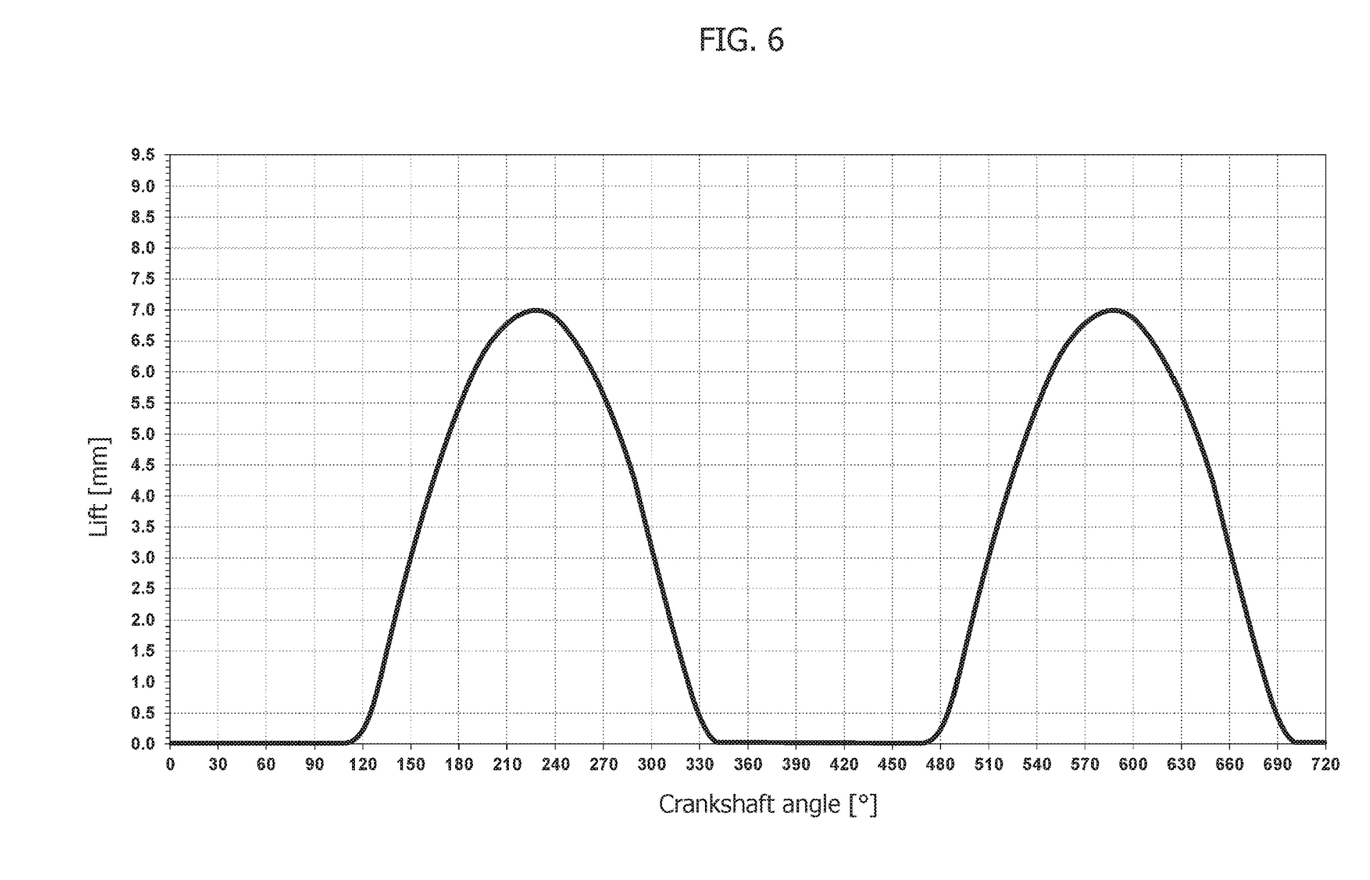
FIG. 6 illustrates an example of cam profile used in the system described herein for actuation of the discharge valves.
Figure 7A:
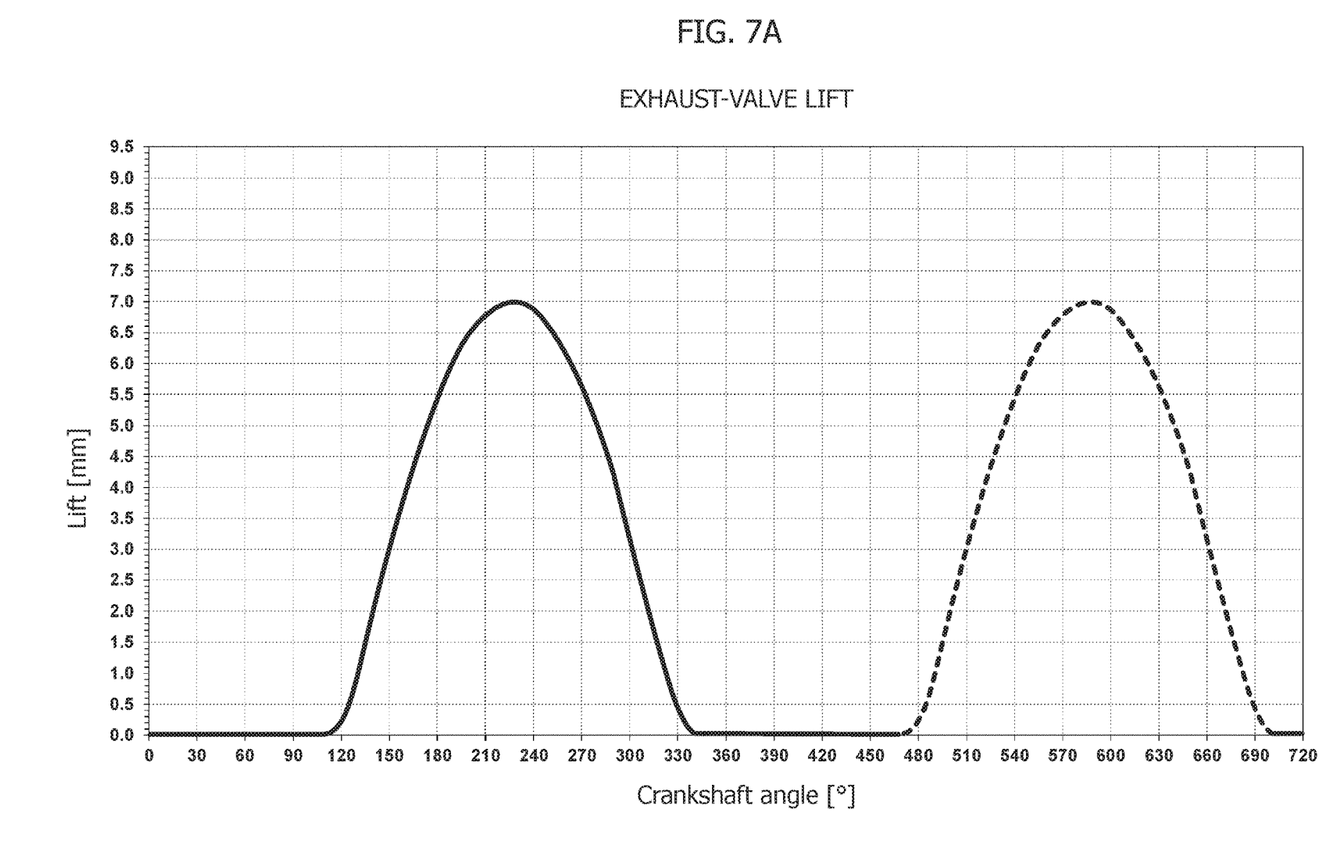
FIGS. 7A and 7B illustrate two different profiles of lift of the exhaust valves of an engine for a four-stroke engine mode and for a two-stroke engine mode, respectively.
Figure 7B:
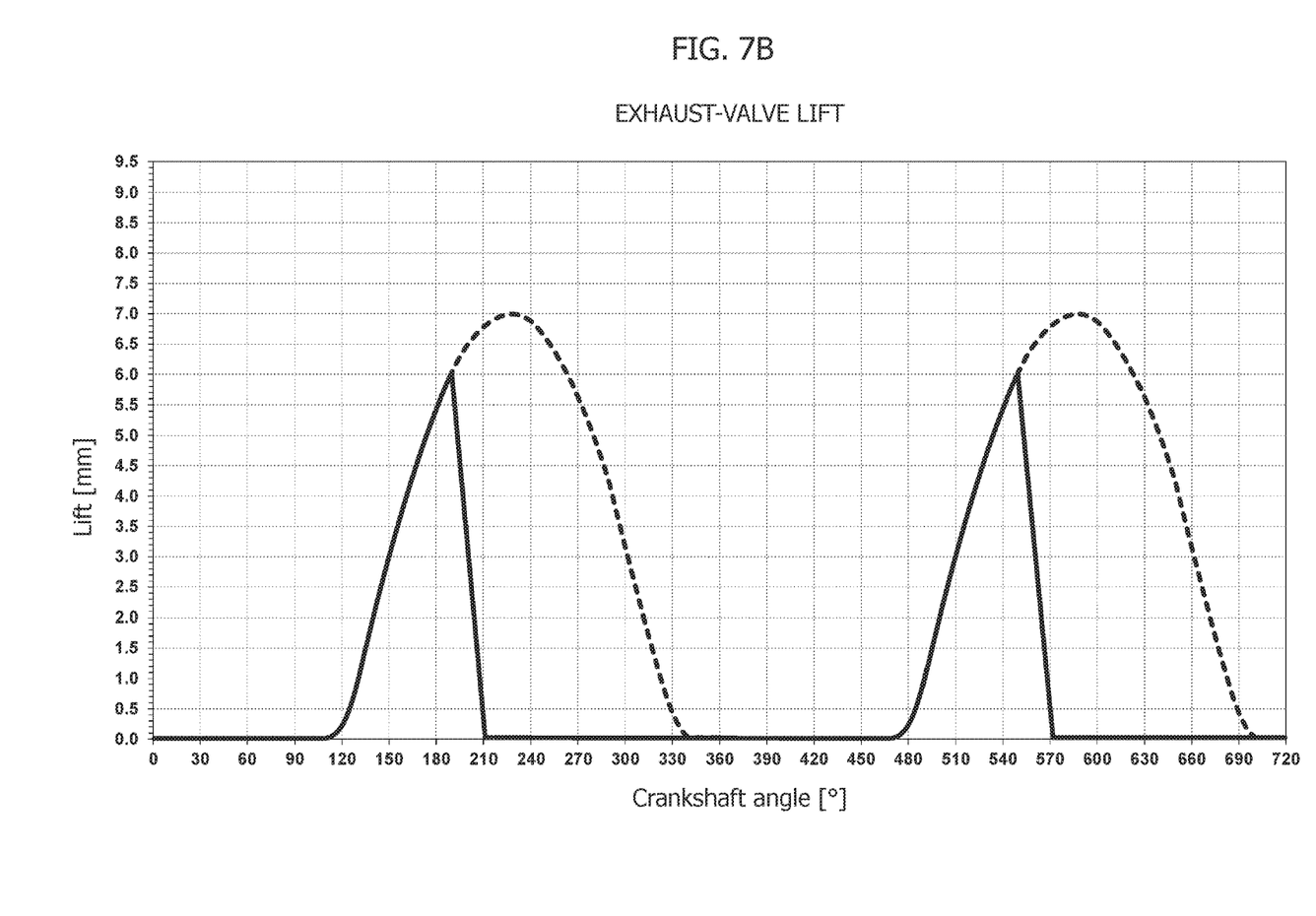

The above description refers to just the intake valves of the cylinder, but it is clear that the same architecture and the same procedure of control described above are applied also for actuation of the exhaust valves precisely in order to be able to control the engine in the two different operating cycles envisaged. In particular, the system will envisage also for the exhaust valves a composite cam profile (see FIG. 6) configured for being able to actuate the exhaust valves both in the four-stroke engine operating mode and in the two-stroke engine operating mode. FIGS. 7A and 7B illustrate two possible lift profiles of the exhaust valves for both the four-stroke engine mode and the two-stroke engine mode, which are obtained from the cam profile of FIG. 6 through the control carried out by the system for actuation of the engine valves described herein.

Of course, without prejudice to the principle of the invention, the embodiments and the details of construction may vary even significantly with respect to what is described and illustrated herein purely by way of example, without thereby departing from the scope of the present invention, as defined by the annexed claims.

Finally, it should noted that the valve 60 indicated above may be a solenoid valve of any known type or else also an electrically actuated valve of a different type, such as a valve with piezoelectric actuator. Also in the case of the solenoid valve, the valve may be of a normally closed type or else of a normally open type. In the latter case, obviously, what is important, for the purposes of the system according to the invention, is the control of the instant when the valve 60 sets up again the communication between the volume of pressurized fluid and the environment communicating with the fluid accumulator 80 irrespective of whether this is obtained by interrupting or activating a current supply.

According to a further characteristic that has already formed the subject of a previous patent application of the present applicant, not yet published at the date of filing of the present application, in the case where the control valve is a normally open solenoid valve, the electronic control unit can be programmed for supplying an electric tail current to the solenoid following upon de-energization thereof in order to brake the movement of the mobile member of the control valve before this reaches its end-of-travel position corresponding to the open condition of the communication between the volume of pressurized fluid and the environment communicating with the fluid accumulator.

What is claimed is:

1. A system for variable actuation of an engine intake valve of an internal-combustion engine, comprising:
   a hydraulic apparatus including:
      a master piston,
      a slave piston configured to be driven by said master piston by a volume of fluid set between said master piston and said slave piston, and
      a solenoid valve configured for being controlled to be in a state in which said volume of fluid is set in communication with an outlet so as to render said slave piston independent from movement of said master piston;
   wherein said system further comprises:
   a single camshaft designed to drive said master piston in motion;
   said camshaft has a cam provided with a composite profile that is defined by a first lobe portion of the cam for governing, through the master piston, the engine valve at least in a four-stroke engine operating mode, and that is defined by a second lobe portion of the cam for governing the engine valve at least in a two-stroke engine operating mode;
   a control unit configured for controlling said solenoid valve so as to govern said engine valve, within the four-stroke engine operating mode, according to a lift and/or opening and closing times that are variable as a function of one or more parameters indicative of operating conditions of the engine;

said control unit is configured for selecting either the two-stroke engine operating mode or the four-stroke engine operating mode as a function of an operating condition of engine load, and, on the basis of the two-stroke or four-stroke engine operating mode selected, for controlling said solenoid valve so as to render said slave piston independent from said master piston along said second lobe portion of said composite cam profile and/or along said first lobe portion of said composite cam profile of said cam;

said control unit configured to select the two-stroke engine operating mode based on the engine load being determined to be greater than a predetermined engine load threshold, and said control unit configured to select the four-stroke engine operating mode based on the engine load being determined to be lower than the predetermined engine load threshold; and a phase-variator device designed to regulate an angular position of said camshaft relative to a crankshaft of the engine so as to be able to vary an instant of opening of said engine intake valve.

2. The system according to claim 1, wherein said control unit is configured for governing said phase-variator device on the basis of the two-stroke or four-stroke engine operating mode selected.

3. The system according to claim 2, wherein said control unit is configured for delaying the instant of opening of said engine valve in said two-stroke engine operating mode.

4. The system according to claim 1, wherein said control unit is configured for comparing a reference value stored therein with a measured parameter indicative of the engine load.

5. The system according to claim 1, wherein said first and second lobe portions of said composite profile are pre-arranged for governing said engine intake valve in said two-stroke engine operating mode, said control unit being configured for controlling said solenoid valve so as to render said slave piston independent from said master piston along said first and second lobe portions so as to govern said engine intake valve according to a lift profile that is different from said first and second lobe portions.

6. The system according to claim 1, wherein, in said four-stroke engine operating mode, said control unit is configured for controlling said solenoid valve so as to render said slave piston independent from said master piston along said first lobe portion or said second lobe portion of said composite profile so as to annul the lift of said engine intake valve, which would otherwise be induced by said first lobe portion or said second lobe portion.

7. A method for controlling a system for variable actuation of an intake engine valve of an internal-combustion engine, wherein said system comprises:
- a hydraulic apparatus including:
  - a master piston actuated by a camshaft;
  - said camshaft has a cam provided with a composite profile that is defined by a first lobe portion of the cam for governing, through the master piston, the engine intake valve at least in a four-stroke engine operating mode, and that is defined by a second lobe portion of the cam for governing the engine intake valve at least in a two-stroke engine operating mode;
  - a slave piston configured to be driven by said master piston by a volume of fluid set between said master piston and said slave piston; and
  - a solenoid valve configured for being controlled to be in a state where said volume of fluid is set in communication with an outlet so as to render said slave piston independent from movement of said master piston; and
- a control unit configured for controlling said solenoid valve so as to govern said engine intake valve according to a lift and/or opening and closing times that are variable as a function of one or more parameters indicative of operating conditions of the engine;

said method further comprising:

selecting one between the two-stroke engine operating mode and the four-stroke engine operating mode on the basis of the operating condition of engine load, wherein the engine load is compared to an engine load threshold and, i) when the engine load is greater than the engine load threshold, selecting the two-stroke engine operating mode, and ii) when the engine load is less than the engine load threshold, selecting the four-stroke engine operating mode;

controlling said solenoid valve on the basis of the selected two-stroke or four-stroke engine operating mode so as to govern said engine intake valve in said selected two-stroke or four-stroke engine operating mode;

for at least one of the two-stroke and four-stroke engine operating modes, controlling said solenoid valve so as to govern said engine intake valve according to a lift and/or opening and closing times that are variable as a function of one or more parameters indicative of the operating conditions of the engine;

wherein said system comprises a phase-variator device designed to regulate an angular position of said camshaft relative to a crankshaft of the engine, and wherein, on the basis of the selected two-stroke or four-stroke engine operating mode, said method includes controlling said phase-variator device so as to be able to vary an instant of opening of said engine intake valve.

8. The method according to claim 7,
wherein, on the basis of the selected two-stroke or four-stroke engine operating mode, said method includes controlling said solenoid valve so as to render said slave piston independent from said master piston along said second lobe portion and/or along said first lobe portion.

9. The method according to claim 8, wherein, in said system for variable actuation of an engine intake valve of an internal-combustion engine, said first and second lobe portions of said composite cam profile are pre-arranged for governing said engine intake valve in said two-stroke engine operating mode, and
wherein, in the two-stroke engine operating mode, said method includes controlling said solenoid valve so as to render said slave piston independent from said master piston along said first and second lobe portions of said composite profile so as to govern said engine intake valve according to a lift profile that is different from said first and second lobe portions.

10. The method according to claim 7, wherein, in said four-stroke engine operating mode, said method includes controlling said solenoid valve so as to render said slave piston independent from said master piston along said first lobe portion or said second lobe portion of said composite profile so as to annul the lift of said engine intake valve, which would otherwise be induced by said first lobe portion or said second lobe portion.

\* \* \* \* \*